US011996057B2

(12) United States Patent
Liu

(10) Patent No.: US 11,996,057 B2
(45) Date of Patent: May 28, 2024

(54) BACKLIGHT MODULE AND DISPLAY DEVICE

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/621,748

(22) PCT Filed: Dec. 16, 2021

(86) PCT No.: PCT/CN2021/138929
§ 371 (c)(1),
(2) Date: Dec. 22, 2021

(87) PCT Pub. No.: WO2023/103023
PCT Pub. Date: Jun. 15, 2023

(65) Prior Publication Data

US 2024/0029662 A1 Jan. 25, 2024

(30) Foreign Application Priority Data

Dec. 6, 2021 (CN) ......................... 202111477471.8

(51) Int. Cl.
*G09G 3/34* (2006.01)

(52) U.S. Cl.
CPC ... *G09G 3/3406* (2013.01); *G09G 2310/0286* (2013.01); *G09G 2330/021* (2013.01)

(58) Field of Classification Search
CPC ......... G09G 3/3406; G09G 2310/0286; G09G 2330/021
See application file for complete search history.

(56) References Cited

U.S. PATENT DOCUMENTS 7,126,608 B2 * 10/2006 Alben .................. G09G 3/2092 345/534
2010/0073275 A1 3/2010 Kim
(Continued)

FOREIGN PATENT DOCUMENTS

CN 101441860 5/2009
CN 102665325 9/2012
CN 103295547 9/2013
(Continued)

OTHER PUBLICATIONS

WIPO machine translation of CN105101550—IDS document originally published Nov. 25, 2015.*

*Primary Examiner* — Antonio Xavier

(57) ABSTRACT

The present disclosure provides a backlight module and a display device. The backlight module includes a control circuit, a power chip, and light emitting devices. The control circuit include a control signal input terminal, and when the control signal input terminal is in a suspended state, the control circuit can output an enable signal. An enable pin of the power chip receives the enable signal, so that the power chip controls an output of a power supply voltage under a control of the enable signal. The light emitting components receive the power supply voltage, and are driven by the power supply voltage to emit light.

14 Claims, 5 Drawing Sheets

(56) References Cited

U.S. PATENT DOCUMENTS

| | | | | |
|---|---|---|---|---|
| 2016/0249420 | A1* | 8/2016 | Zhang ................ | H05B 45/3725 |
| 2017/0047022 | A1 | 2/2017 | Ikeda | |

FOREIGN PATENT DOCUMENTS

| | | |
|---|---|---|
| CN | 103745691 | 4/2014 |
| CN | 104252840 | 12/2014 |
| CN | 105101550 | 11/2015 |
| CN | 106710531 | 5/2017 |
| CN | 108574260 | 9/2018 |
| CN | 108665859 | 10/2018 |
| CN | 109377952 | 2/2019 |
| CN | 109410868 | 3/2019 |
| CN | 109461415 | 3/2019 |
| CN | 208724068 | 4/2019 |
| CN | 110379373 | 10/2019 |
| CN | 110648635 | 1/2020 |
| CN | 211455262 | 9/2020 |
| CN | 112185305 | 1/2021 |
| CN | 113012652 | 6/2021 |
| JP | 2013-142869 | 7/2013 |
| TW | 201030722 | 8/2010 |

* cited by examiner

BACKLIGHT MODULE AND DISPLAY DEVICE

RELATED APPLICATIONS

This application is a National Phase of PCT Patent Application No. PCT/CN2021/138929 having International filing date of Dec. 16, 2021, which claims the benefit of priority of Chinese Patent Application No. 202111477471.8 filed on Dec. 6, 2021. The contents of the above applications are all incorporated by reference as if fully set forth herein in their entirety.

FIELD AND BACKGROUND OF THE INVENTION

The present disclosure relates to a field of display technology, and more particularly to a backlight module and a display device.

A liquid crystal display (LCD) product is composed of a display panel and a backlight module. Since the display panel has a problem that pictures are abnormal when the display panel is turned on or turned off caused by insufficient discharge, the problem is usually avoided by adjusting a timing of the backlight module. Specifically, the backlight module is required to be turned on after a screen and turned off before the screen, so that the pictures of the display panel when the display panel is turned on or turned off are not perceived by consumers. If the above timing control is to be achieved, the display panel and the backlight module need to be uniformly controlled to be turned on or turned off by a system on chip (SOC) board.

SUMMARY OF THE INVENTION

However, if a product side sells the backlight module separately, the SOC is assembled at a client side. If the above method is still used to light the backlight module, it is necessary to separately design a production jig for lighting the backlight module, and there is a wiring process when using the jig, which increases a production cost.

The present disclosure provides a backlight module and a display device, so as to solve a technical problem that when lighting an independent backlight module, the production jig for lighting the backlight module needs to be designed, which increases the production cost.

The present disclosure provides the backlight module, including:

A control circuit, wherein the control circuit receives a first power signal, a second power signal, and a third power signal, the control circuit includes a control signal input terminal, the control signal input terminal is configured to receive a control signal, and when the control signal input terminal is in a suspended state, the control circuit is configured to output an enable signal under a control of the first power signal, the second power signal, and the third power signal.

A power chip, wherein the power chip includes an enable pin, the enable pin receives the enable signal, and the power chip is configured to control an output of a power supply voltage under a control of the enable signal.

Light emitting components, wherein the light emitting components receive the power supply voltage, and the light emitting components are driven by the power supply voltage to emit light.

Optionally, in some embodiments of the present disclosure, the control circuit includes a first control module and a second control module.

The first control module receives the first power signal, the second power signal, and the third power signal, the first control module is electrically connected to a first node and the control signal input terminal, the first control module is configured to control a potential of the first node based on a potential of the control signal input terminal, the first power signal, the second power signal, and the third power signal.

The second control module receives the first power signal and the third power signal, the second control module is electrically connected to the first node, and the second control module is configured to output the enable signal based on the potential of the first node, the first power signal, and the third power signal.

Optionally, in some embodiments of the present disclosure, the first control module includes a first transistor, a first resistor, and a second resistor.

A gate of the first transistor and one end of the first resistor are electrically connected to the control signal input terminal, one of a source and a drain of the first transistor receives the third power signal, another of the source and the drain of the first transistor and one end of the second resistor are electrically connected to the first node, another end of the second resistor receives the first power signal, and another end of the first resistor receives the second power signal.

Optionally, in some embodiments of the present disclosure, the control circuit further includes a storage capacitor and a third resistor.

One end of the storage capacitor receives the third power signal, another end of the storage capacitor is connected to the gate of the first transistor, and the third resistor is serially connected between the gate of the first transistor and the control signal input terminal.

Optionally, in some embodiments of the present disclosure, the second control module includes a second transistor and a fourth resistor.

A gate of the second transistor is electrically connected to the first node, one of a source and a drain of the second transistor receives the third power signal, another of the source and the drain of the second transistor and one end of the fourth resistor are electrically connected to an enable signal output terminal, and another end of the fourth resistor receives the first power signal.

Optionally, in some embodiments of the present disclosure, the second control module further includes a fifth resistor, and the fifth resistor is serially connected between another of the source and the drain of the second transistor and the enable signal output terminal.

Optionally, in some embodiments of the present disclosure, wherein the second control module includes a pull-up unit, a first control unit, and a second control unit, the enable signal includes a first enable signal and a second enable signal.

The pull-up unit includes a fourth resistor, one end of the fourth resistor receives the first power signal, and another end of the fourth resistor is electrically connected to a first enable signal output terminal and a second enable signal output terminal.

The first control unit includes a second transistor, a gate of the second transistor is electrically connected to the first node, one of a source and a drain of the second transistor receives the third power signal, and another of the source and the drain of the second transistor is electrically connected to the first enable signal output terminal.

The second control unit includes a third transistor, a gate of the third transistor is electrically connected to the first node, one of a source and a drain of the third transistor receives the third power signal, and another of the source and the drain of the third transistor is electrically connected to the second enable signal output terminal.

Optionally, in some embodiments of the present disclosure, the control circuit outputs a plurality of the enable signals, at least one power chip is provided, and each power chip receives a corresponding enable signal.

Optionally, in some embodiments of the present disclosure, the backlight module includes a first working state, a second working state, and a third working state.

In the first working state, the control signal input terminal is in the suspended state, the enable signal is at a high level, and the light emitting components emit light; in the second working state, the control signal is at a first level, the enable signal is at the high level, and the light emitting components emit light; in the third working state, the control signal is at a second level, the enable signal is at a low level, and the light emitting components are turned off.

Optionally, in some embodiments of the present disclosure, the light emitting components are mini light emitting diodes, micro light emitting diodes, or organic light emitting diodes.

Optionally, in some embodiments of the present disclosure, when the control signal input terminal is in the suspended state, the first power signal and the second power signal are disconnected, and the light emitting components are turned off.

Correspondingly, the present disclosure also provides a display device, including a display panel, a system chip, and a backlight module, the system chip is respectively connected to the display panel and the backlight module, and the backlight module includes:

A control circuit, wherein the control circuit receives a first power signal, a second power signal, and a third power signal, the control circuit includes a control signal input terminal, the control signal input terminal is configured to receive a control signal, and when the control signal input terminal is in a suspended state, the control circuit is configured to output an enable signal under a control of the first power signal, the second power signal, and the third power signal.

A power chip, wherein the power chip includes an enable pin, the enable pin receives the enable signal, and the power chip is configured to control an output of a power supply voltage under a control of the enable signal.

Light emitting components, wherein the light emitting components receive the power supply voltage, and the light emitting components are driven by the power supply voltage to emit light.

Optionally, in some embodiments of the present disclosure, the control circuit includes a first control module and a second control module.

The first control module receives the first power signal, the second power signal, and the third power signal, the first control module is electrically connected to a first node and the control signal input terminal, the first control module is configured to control a potential of the first node based on a potential of the control signal input terminal, the first power signal, the second power signal, and the third power signal.

The second control module receives the first power signal and the third power signal, the second control module is electrically connected to the first node, and the second control module is configured to output the enable signal based on the potential of the first node, the first power signal, and the third power signal.

Optionally, in some embodiments of the present disclosure, the first control module includes a first transistor, a first resistor, and a second resistor.

A gate of the first transistor and one end of the first resistor are electrically connected to the control signal input terminal, one of a source and a drain of the first transistor receives the third power signal, another of the source and the drain of the first transistor and one end of the second resistor are electrically connected to the first node, another end of the second resistor receives the first power signal, and another end of the first resistor receives the second power signal.

Optionally, in some embodiments of the present disclosure, the control circuit further includes a storage capacitor and a third resistor.

One end of the storage capacitor receives the third power signal, another end of the storage capacitor is connected to the gate of the first transistor, and the third resistor is serially connected between the gate of the first transistor and the control signal input terminal.

Optionally, in some embodiments of the present disclosure, the second control module includes a second transistor and a fourth resistor.

A gate of the second transistor is electrically connected to the first node, one of a source and a drain of the second transistor receives the third power signal, another of the source and the drain of the second transistor and one end of the fourth resistor are electrically connected to an enable signal output terminal, and another end of the fourth resistor receives the first power signal.

Optionally, in some embodiments of the present disclosure, wherein the second control module further includes a fifth resistor, and the fifth resistor is serially connected between another of the source and the drain of the second transistor and the enable signal output terminal.

Optionally, in some embodiments of the present disclosure, the second control module includes a pull-up unit, a first control unit, and a second control unit, the enable signal includes a first enable signal and a second enable signal.

The pull-up unit includes a fourth resistor, one end of the fourth resistor receives the first power signal, and another end of the fourth resistor is electrically connected to a first enable signal output terminal and a second enable signal output terminal.

Optionally, in some embodiments of the present disclosure, the first control unit includes a second transistor, a gate of the second transistor is electrically connected to the first node, one of a source and a drain of the second transistor receives the third power signal, and another of the source and the drain of the second transistor is electrically connected to the first enable signal output terminal.

The second control unit includes a third transistor, a gate of the third transistor is electrically connected to the first node, one of a source and a drain of the third transistor receives the third power signal, and another of the source and the drain of the third transistor is electrically connected to the second enable signal output terminal.

Optionally, in some embodiments of the present disclosure, the control circuit outputs a plurality of the enable signals, at least one power chip is provided, and each power chip receives a corresponding enable signal.

Optionally, in some embodiments of the present disclosure, the backlight module includes a first working state, a second working state, and a third working state.

In the first working state, the control signal input terminal is in the suspended state, the enable signal is at a high level, and the light emitting components emit light; in the second working state, the control signal is at a first level, the enable signal is at the high level, and the light emitting components emit light; in the third working state, the control signal is at a second level, the enable signal is at a low level, and the light emitting components are turned off.

The present disclosure provides the backlight module and the display device. The backlight module includes the control circuit, the power chip, and the light emitting components. When the control signal input terminal is in the suspended state, the control circuit can output the enable signal under the control of the first power signal, the second power signal, and the third power signal. The power chip includes the enable pin that receives the enable signal to control the output of the power supply voltage under the control of the enable signal. The light emitting components receive the power supply voltage, and the light emitting components are driven by the power supply voltage to emit light. In the present disclosure, the control circuit is additionally disposed in the backlight module, so that when the backlight module is not connected to the SOC, a lighting function is still be achieved, the production jig for lighting the backlight module does not need to be designed separately, which reduces the production cost.

BRIEF DESCRIPTION OF THE SEVERAL VIEWS OF THE DRAWINGS

In order to more clearly explain the technical solutions in the embodiments of the present disclosure, the following briefly introduces the drawings used in descriptions of the embodiments. Obviously, the drawings in the following description are only some embodiments of the present disclosure. For those skilled in the art, other drawings may be obtained based on these drawings without creative work.

DESCRIPTION OF SPECIFIC EMBODIMENTS OF THE INVENTION

In order to more clearly explain the technical solutions in embodiments of the present disclosure, the following briefly introduces drawings used in description of the embodiments. Obviously, the drawings in the following description are only some embodiments of the present disclosure. All other embodiments obtained by those skilled in the art without creative work are within the protection scope of the present disclosure.

In the descriptions of the present disclosure, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features, therefore should not be construed as limiting the present disclosure.

The present disclosure provides a backlight module and a display device, which are described in detail below. It should be noted that a description order of following embodiments is not intended to limit a preferred order of embodiments of the present disclosure.

Figure 1:
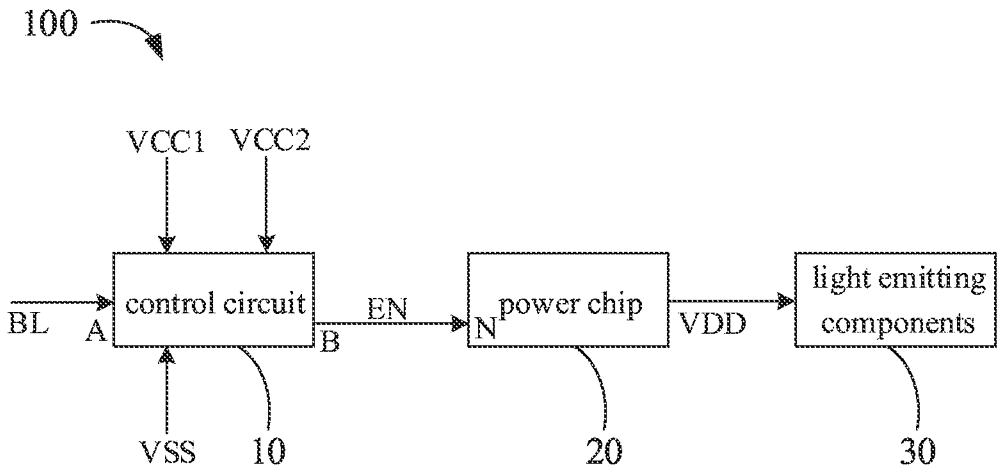
FIG. 1 is a first schematic structural diagram of a backlight module provided by the present disclosure.

Please refer to FIG. 1. FIG. 1 is a first schematic structural diagram of a backlight module provided by the present disclosure. In the present disclosure, the backlight module 100 includes a control circuit 10, a power chip 20, and light emitting components 30. The control circuit 10 receives a first power signal VCC1, a second power signal VCC2, and a third power signal VSS. The control circuit 10 includes a control signal input terminal A. The control signal input terminal A is configured to receive a control signal BL. When the control signal input terminal A is in a suspended state, the control circuit 10 is configured to output an enable signal EN under a control of the first power signal VCC1, the second power signal VCC2, and the third power signal VCC3. The power chip 20 includes an enable pin N. The enable pin N is configured to receive the enable signal EN. The power chip 20 is configured to control an output of a power supply voltage VDD under a control of the enable signal EN. The light emitting components 30 receive the power supply voltage VDD. The light emitting components 30 are configured to be driven by the power supply voltage VDD to emit light.

The control signal input terminal A is in the suspended state, which indicates that the control signal input terminal A does not receive the control signal BL input from outside, or it may be understood as that the control signal BL is not present. That is, the backlight module 100 is not externally connected to a SOC or other production jig that can provide the control signal BL.

A plurality of the light emitting components 30 may be provided, which is specifically set according to a size of the backlight module 100 and a requirement of light emitting brightness. The light emitting components 30 may be mini light emitting diodes, micro light emitting diodes, or organic light emitting diodes.

The control circuit 10 is additionally disposed in the backlight module 100. When the backlight module 100 is not connected to the SOC, the control signal input terminal A is in the suspended state, the control circuit 10 can still output the enable signal EN under the control of the first power signal VCC1, the second power signal VCC2, and the third power signal VSS, thereby realizing a lighting function of the backlight module 100. Therefore, when the backlight module 100 is used independently, there is no need to separately design the production jig for lighting the backlight module 100, and there is no need to perform a wiring process that exists when using the jig, thereby reducing a production cost and improving production convenience.

In the present disclosure, normally, when the enable signal EN is at a high level, a potential of the enable pin N is pulled high, and the power chip 20 outputs the power supply voltage VDD. When the enable signal EN is at a low level, the potential of the enable pin N is pulled low, and the power chip 20 does not work, that is, the power chip 20 does not output the power supply voltage VDD. Only when the power chip 20 outputs the power supply voltage VDD, the light emitting components can be driven by the power supply voltage VDD to emit light. Certainly, the present disclosure is not limited thereto. The power chip 20 may also work under a trigger of a low-level signal to output the power supply voltage VDD, which may be specifically set according to a logic circuit of the power chip 20.

It should be noted that, the following embodiments of the present disclosure all take when the enable signal EN is at the high level, the power chip 20 outputs the power supply voltage VDD as an example for description, but should not be understood as a limitation of the present disclosure.

In the present disclosure, the backlight module 100 includes a first working state, a second working state, and a third working state. In the first working state, the control signal input terminal A is in the suspended state, the enable signal EN is at the high level, the power supply chip 20 outputs the power supply voltage VDD, and the light emitting components 30 emit light. In the second working state, the control signal input terminal A receives the control signal BL, and the control signal BL is at a first level, the enable signal EN is at the high level, the power supply chip 20 outputs the power supply voltage VDD, and the light emitting components 30 emit light. In the third working state, the control signal input terminal A receives the control signal BL, and the control signal BL is at a second level, the enable signal BL is at the low level, the power chip 20 is in a non-working state, and the light emitting components 30 are turned off.

When the first level is at a high level, the second level is at a low level. When the first level is at a low level, the second level is at a high level. Voltage values of the first level and the second level may be set according to a circuit structure of the control circuit 10, which is described in the following embodiments, and details are not described again.

It can be seen that, in the present disclosure, when the control signal BL form the outside is not received, the backlight module 100 can be independently lit. When the control signal BL provided by the outside is received, the backlight module 100 can also be triggered by the control signal BL to turn on or turn off, thereby increasing application scenarios of the backlight module 100, and improving working performance of the backlight module 100. In addition, when the control signal BL is not received from the outside, it is only necessary to disconnect the first power signal VCC1 and the second power signal VCC2, that is, the backlight module 100 can be turned off.

Figure 2:
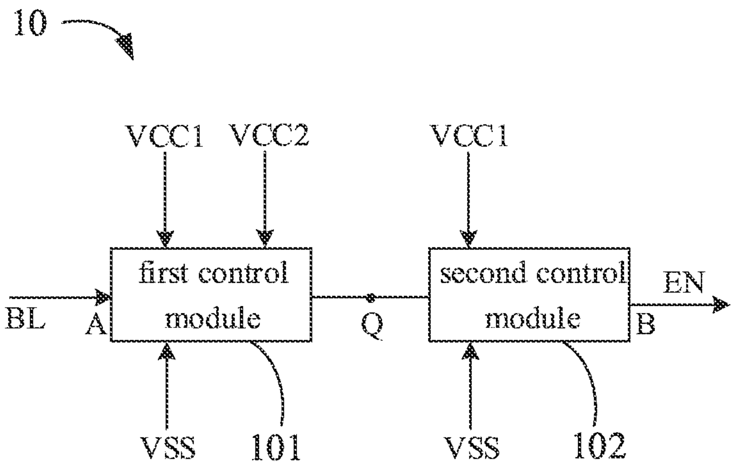
FIG. 2 is a schematic structural diagram of a control circuit provided by the present disclosure.

Please refer to FIG. 2, FIG. 2 is a schematic structural diagram of a control circuit provided by the present disclosure. In the present disclosure, the control circuit 10 includes a first control module 101 and a second control module 102.

The first control module 101 receives the first power signal VCC1, the second power signal VCC2, and the third power signal VSS, the first control module 101 is electrically connected to a first node Q and the control signal input terminal A. The first control module 101 is configured to control a potential of the first node Q based on a potential of the control signal input terminal A, the first power signal VCC1, the second power signal VCC2, and the third power signal VCC3.

The second control module 102 receives the first power signal VCC1 and the third power signal VSS, the second control module 102 is electrically connected to the first node Q. The second control module 102 is configured to output the enable signal EN based on the potential of the first node Q, the first power signal VCC1, and the third power signal VSS.

Figure 3:
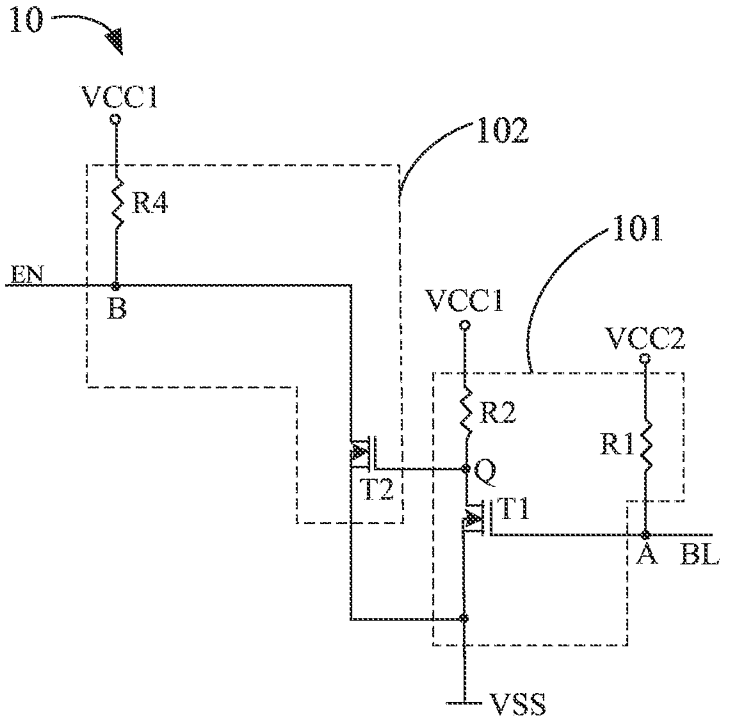
FIG. 3 is a schematic structural diagram of a first circuit of the control circuit shown in FIG. 2.

Specifically, please refer to FIG. 3, FIG. 3 is a schematic structural diagram of a first circuit of the control circuit shown in FIG. 2. In an embodiment, the first control module 101 includes a first transistor T1, a first resistor R1, and a second resistor R2.

A gate of the first transistor T1 and one end of the first resistor R1 are electrically connected to the control signal input terminal A. One of a source and a drain of the first transistor T1 receives the third power signal VSS. Another of the source and the drain of the first transistor T1 and one end of the second resistor R2 are electrically connected to the first node Q. Another end of the second resistor R2 receives the first power signal VCC1. Another end of the first resistor R1 receives the second power signal VCC2.

The second control module 102 includes a second transistor T2 and a fourth resistor R4. A gate of the second transistor T2 is electrically connected to the first node Q. One of a source and a drain of the second transistor T2 receives the third power signal VSS. Another of the source and the drain of the second transistor T2 and one end of the fourth resistor R4 are electrically connected to an enable signal output terminal B. Another end of the fourth resistor R4 receives the first power signal VCC1.

Refer to FIG. 1 and FIG. 3, when the control signal input terminal A is in the suspended state, under a pull-up action of the first resistor R1 and the second power signal VCC2, the potential of the control signal input terminal A is pulled high. A potential of the gate of the first transistor T1 is raised, and the first transistor T1 is turned on. The third power signal VSS is transmitted to the first node Q through the first transistor T1. The potential of the first node Q is pulled low. The second transistor T2 is turned off. Under a pull-up action of the fourth resistor R4 and the first power signal VCC1, a potential of the enable signal output terminal B is pulled high. That is, the enable signal EN output by the control circuit 10 is at the high level. The power chip 20 is triggered by the enable signal EN to output the power voltage VDD. The light emitting components 30 are driven by the power supply voltage VDD to emit light.

It should be noted that in the above process, the first power supply voltage VCC1 and the second resistor R2 have a pull-up effect on the potential of the first node Q. However, since a potential of the third power signal VSS is lower, when the first transistor T1 is turned on, the potential of the first node Q is pulled down to a low potential.

When the control signal input terminal A receives the control signal BL, and the control signal BL is at a high level, the potential of the control signal input terminal A is at the high level. The first transistor T1 is turned on. The third power signal VSS is transmitted to the first node Q through the first transistor T1. The potential of the first node Q is pulled low. The second transistor T2 is turned off. Under a pull-up action of the fourth resistor R4 and the first power signal VCC1, the potential of the enable signal output terminal B is pulled high. That is, the enable signal EN output by the control circuit 10 is at the high level. The power chip 20 is triggered by the enable signal EN to output the power supply voltage VDD. The light emitting components 30 are driven by the power supply voltage VDD to emit light.

When the control signal input terminal A receives the control signal BL, and the control signal BL is at a low level, the first transistor T1 is turned off. Under a pull-up action of the second resistor R2 and the first power signal VCC1, the potential of the first node Q is pulled high. The second transistor T2 is turned on. The third power signal VSS is transmitted to the enable signal output terminal B through the second transistor T2. The potential of the enable signal output terminal B is pulled low. That is, the enable signal EN output by the control circuit 10 is at the low level. The power chip 20 is in a non-working state under a trigger of the enable signal EN, and the power chip 20 does not output the power supply voltage VDD. The light emitting components 30 are turned off.

It should be noted that in the above process, the second power supply signal VCC2 and the first resistor R1 have a pull-up effect on the potential of the control signal input terminal A. However, since the potential of the control signal BL is lower, when the control signal BL is at the low level, the potential of the control signal input terminal A is pulled down to a low potential. Similarly, the first power supply signal VCC1 and the fourth resistor R4 also have a pull-up effect on the potential of the enable signal output terminal B. However, since the potential of the third power signal VSS is lower, when the second transistor T2 is turned on, the potential of the enable signal output terminal B is pulled down to a low potential.

Transistors used in the present disclosure may include two types of P-type transistors and/or N-type transistors. The P-type transistor is turned on when a gate is at a low level, and is turned off when the gate is at a high level. The N-type transistor is turned on when a gate is at a high level, and is turned off when the gate is at a low level. In addition, the transistors used in the present disclosure may be thin film transistors, or field effect transistors, or other components having same characteristics, since sources and drains of the transistors used are symmetrical, the sources and the drains thereof are interchangeable. In the present disclosure, in order to distinguish two electrodes of a transistor other than the gate, one of the electrodes is called the source, and another electrode is called the drain. According to forms in the accompanying drawings, it is stipulated that a middle end of a switching transistor is the gate, a signal input end is the source, and an output end is the drain. It should be noted that the transistors in the embodiments of the present disclosure are all described by taking N-type transistors as an example, but it should not be understood as a limitation of the present disclosure.

Figure 4:
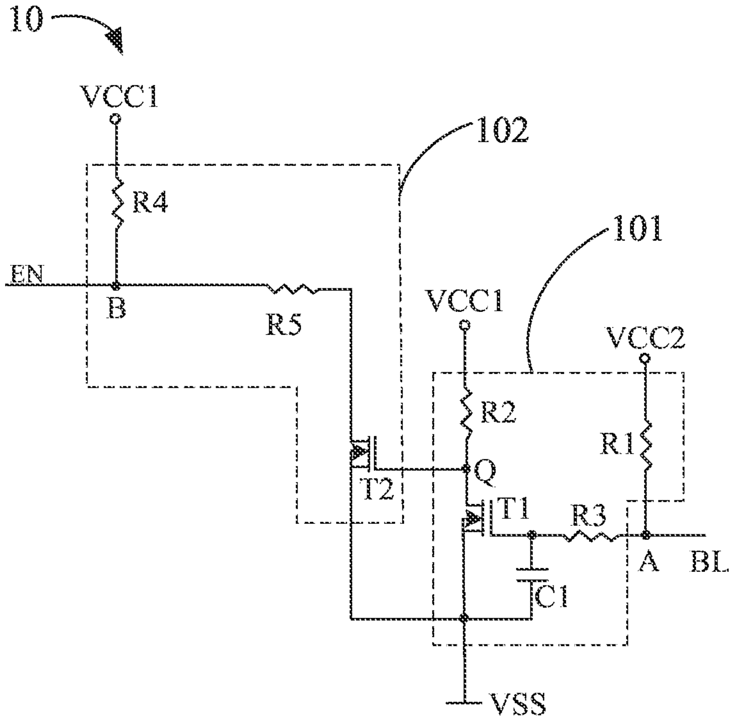
FIG. 4 is a schematic structural diagram of a second circuit of the control circuit shown in FIG. 2.

Please refer to FIG. 4, FIG. 4 is a schematic structural diagram of a second circuit of the control circuit shown in FIG. 2. A difference from the control circuit 10 shown in FIG. 3 is that, in an embodiment, the control circuit 10 further includes a storage capacitor C1 and a third resistor R3.

Specifically, one end of the storage capacitor C1 receives the third power signal VSS. Another end of the storage capacitor C1 is connected to the gate of the first transistor T1. The third resistor R3 is serially connected between the gate of the first transistor T1 and the control signal input terminal A.

The storage capacitor C1 mainly plays a role of filtering. In the backlight module 100, since a wiring of the control signal BL is relatively long, the control signal BL suffers more interference. The storage capacitor C1 is added to the control circuit 10, so that abnormal noise interference can be prevented, and stability of the control circuit 10 is improved. The third resistor R3 is serially connected on a signal path and mainly plays a role in reducing a driving current. Therefore, when a voltage of the control signal BL is too large, a large current generated to damage the first transistor T1 is avoided.

Furthermore, in some embodiments of the present disclosure, the second control module 102 further includes a fifth resistor R5. The fifth resistor R5 is serially connected between another of the source and the drain of the second transistor T2 and the enable signal output terminal B.

Similarly, the fifth resistor R5 is serially connected on a signal path, and mainly plays a role in reducing a driving current. An abnormal large current in a circuit is prevented from affecting normal operation of the control circuit 10.

In the present disclosure, a voltage value of the first power signal VCC1 may be 5V (volts). A voltage value of the second power signal VCC2 may be 3.3V. Certainly, the present disclosure is not limited thereto. The potential of the third power signal VSS may be a potential of a ground terminal. Certainly, it's understandable that the potential of the third power signal VSS may also be another potential.

In the present disclosure, the first resistor R1, the second resistor R2 and the fourth resistor R4 are pull-up resistors, and their resistance values can be set according to actual requirements. If the resistance value is too small, it can be known from a formula power consumption P=U2/R that a static power consumption is too high. If the resistance value is too large, a voltage divider principle may cause a voltage actually obtained by a pull-up network to be too low, so that the high level cannot be guaranteed. A resistance usually has a nominal value, such as 1K (1K is equal to 1000 ohms), 4.7K, 10K, etc. Therefore, in the present disclosure, the first resistor R1, the second resistor R2, and the fourth resistor R4 may be 1 K, 4.7, 10 K, etc., but are not limited thereto. The resistance values of the third resistor R3 and the fifth resistor R5 may be 22 ohms.

Figure 5:
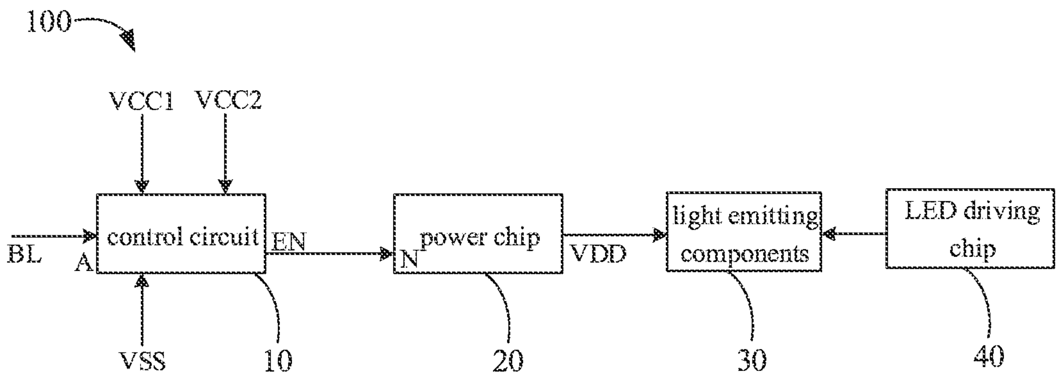
FIG. 5 is a second schematic structure diagram of a backlight module provided by the present disclosure.

Please refer to FIG. 5, FIG. 5 is a second schematic structure diagram of a backlight module provided by the present disclosure. A different from the backlight module 100 shown in FIG. 1 is that, in the backlight module 100 provided by the embodiment, the backlight module 100 further includes an LED driving chip 40. The LED driving chip 40 is connected to the light emitting components 30.

In the backlight module 100, a driving circuit is disposed in the LED driving chip 40 to cooperate with the power supply voltage VDD to drive the light emitting components 30 to emit light. In addition, the LED driver chip 40 is further provided with a constant current source for a constant current control to ensure that a current flowing through the light emitting components 30 is constant. So that the backlight module 100 emits light uniformly.

Figure 6:
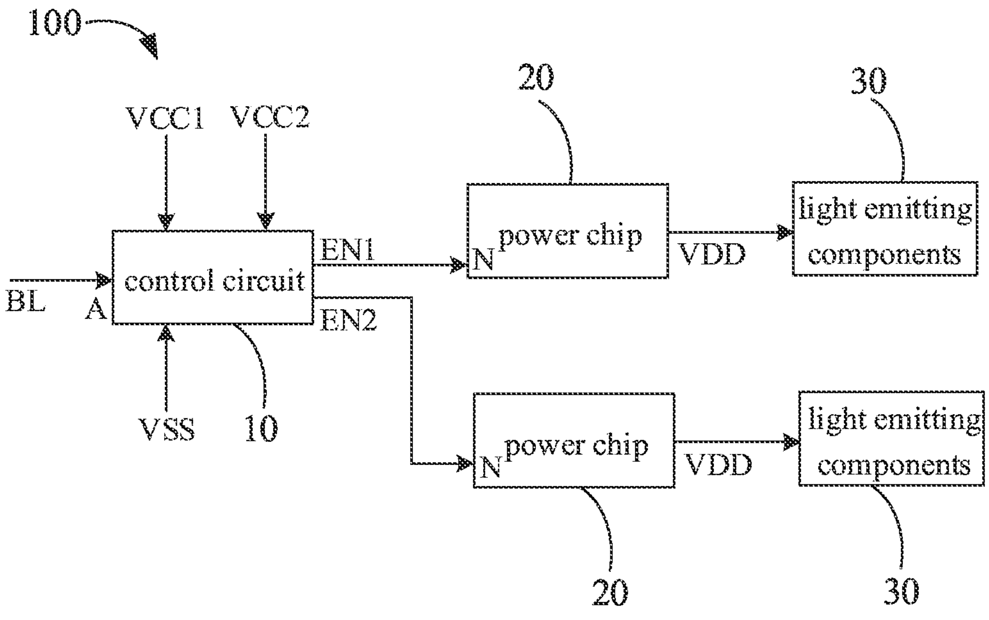
FIG. 6 is a third schematic structural diagram of a backlight module provided by the present disclosure.

Please refer to FIG. 6, FIG. 6 is a third schematic structural diagram of a backlight module provided by the present disclosure. A difference between the backlight module 100 described in FIG. 1 is that in an embodiment, the control circuit outputs a plurality of enable signals. A plurality of the power chips 20 are provided. The embodiment of the present disclosure takes two power chips 20 as an example for description, but cannot be construed as a limitation of the present disclosure.

Each power chip 20 needs to receive a corresponding enable signal EN to control the output of the power supply voltage VDD. For example, in an embodiment, two power chips 20 are provided. The control circuit 10 outputs a first enable signal EN1 and a second enable signal EN2 under a control of the control signal BL, the first power supply signal VCC1, the second power supply signal VCC2, and the third power supply signal VSS. An enable pin N of one of the power chips 20 receives the first enable signal EN1. An enable pin N of another power chip 20 receives the second enable signal EN2.

Figure 7:
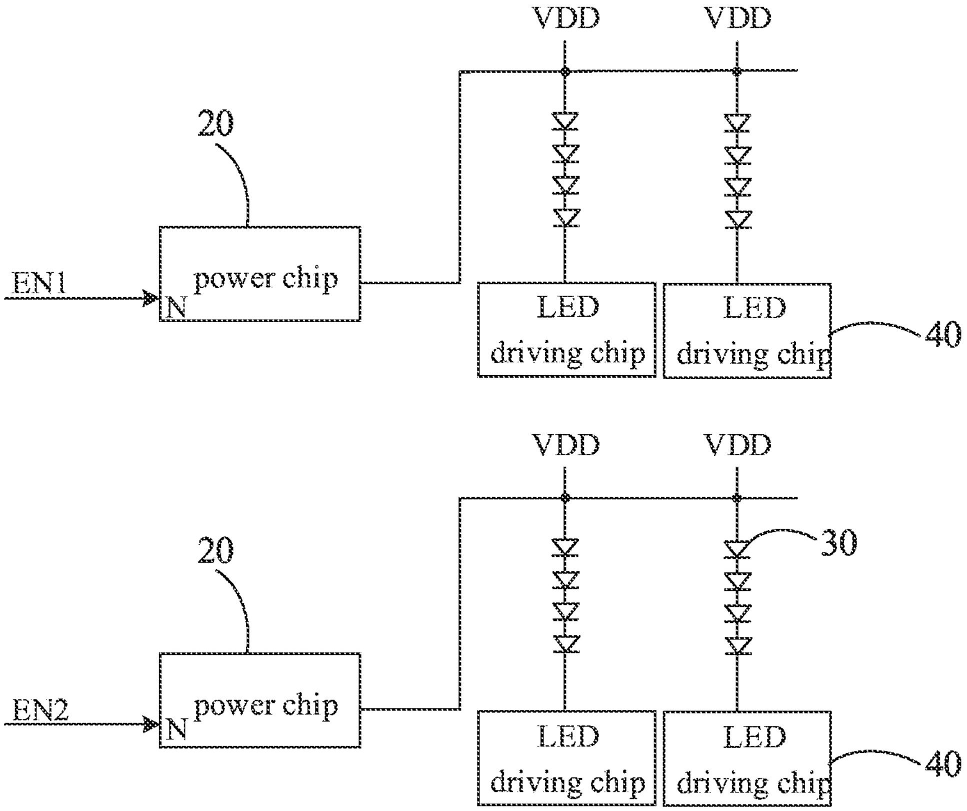
FIG. 7 is a partial schematic structural diagram of a backlight module provided by the present disclosure.

It is understandable that, as shown in FIG. 6 and FIG. 7, FIG. 7 is a partial schematic structural diagram of a backlight module provided by the present disclosure. When there are more light emitting components 30 in the backlight module 100, a load of the power chip 20 is relatively large. One power chip 20 cannot completely drive all the light emitting components 30 to emit light normally. Therefore, it is necessary to provide a plurality of power chips 20 in the backlight module 100 to respectively provide the power supply voltage VDD to corresponding light emitting components 30, so as to improve a driving efficiency of the backlight module 100.

Figure 8:
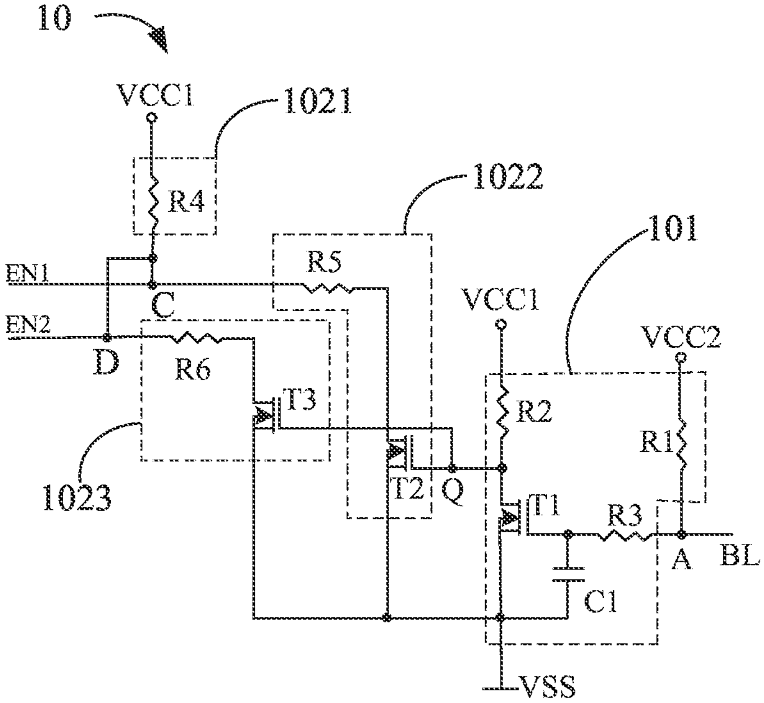
FIG. 8 is a schematic circuit diagram of a control circuit of the backlight module shown in FIG. 6.

Furthermore, please refer to FIG. 8, FIG. 8 is a schematic circuit diagram of a control circuit of the backlight module shown in FIG. 6. In an embodiment, a circuit structure of the first control module 101 can refer to the circuit structure of the first control module 101 in the control circuit 10 shown in FIG. 3 or FIG. 4, and details are not described again.

The second control module 102 includes a pull-up unit 1021, a first control unit 1022, and a second control unit 1023. The enable signal EN includes a first enable signal EN1 and a second enable signal EN2.

Specifically, the pull-up unit 1021 includes a fourth resistor R4. One end of the fourth resistor 4 receives the first power signal VCC1. Another end of the fourth resistor R4 is electrically connected to a first enable signal output terminal C.

The first control unit 1022 includes a second transistor T2. A gate of the second transistor T2 is electrically connected to the first node Q. One of a source and a drain of the second transistor T2 receives the third power signal VSS. Another of the source and the drain of the second transistor T2 is electrically connected to the first enable signal output terminal C.

The second control unit 1023 includes a third transistor T3. A gate of the third transistor T3 is electrically connected to the first node Q. One of a source and a drain of the third transistor T3 receives the third power signal VSS. Another of the source and the drain of the third transistor T3 is electrically connected to the second enable signal output terminal D.

In the embodiment, the control circuit 10 may output the first enable signal EN1 through the first enable signal output terminal C, and output the second enable signal EN2 through the second enable signal output terminal D. Thereby, two power chips 20 may be provided in the backlight module 100 to improve driving capability of the backlight module 100.

Furthermore, in some embodiments, the first control unit 1022 further includes a fifth resistor R5. The fifth resistor R5 is serially connected between another of the source and the drain of the second transistor T2 and the enable signal output terminal B. The second control unit 1023 also includes a sixth resistor R6. The sixth resistor R6 is serially connected between another of the source and drain of the third transistor T3 and the second enable signal output terminal D.

The fifth resistor R5 and the sixth resistor R6 are serially connected on a signal path and mainly play a role in reducing a driving current. An abnormal large current in a circuit is prevented from affecting normal operation of the control circuit 10.

It should be noted that in other embodiments of the present disclosure, the control circuit 10 may include more control units. A circuit structure of each control unit is same as a circuit structure of the first control unit 1022 or the second control unit 1023. Therefore, the control circuit 10 can output more enable signals EN to control more power chips 20 to work, and details are not described again.

Correspondingly, the present disclosure further provides a display device. The display device includes a backlight module. The backlight module is the backlight module described in any one of the above embodiments, for details, refer to the above content, and details are not described again. In the present disclosure, the display device may be a smartphone, a tablet computer, a video player, a personal computer (PC), etc., which is not limited in the present disclosure.

Figure 9:
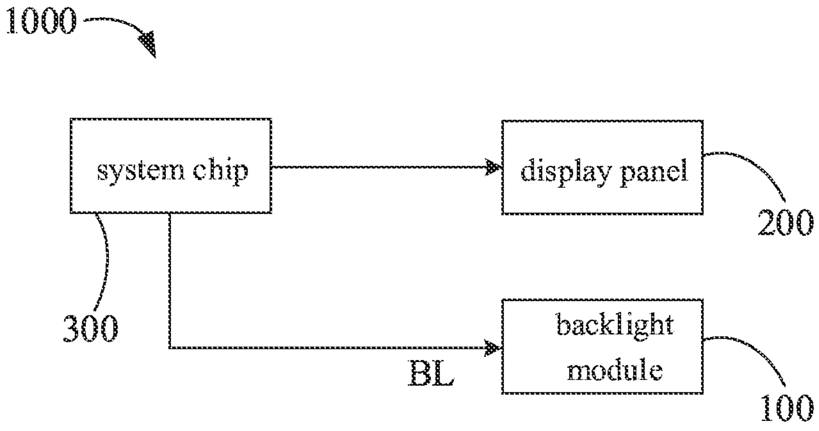
FIG. 9 is a schematic structural diagram of a display device provided by the present disclosure.

Specifically, please refer to FIG. 9, FIG. 9 is a schematic structural diagram of a display device provided by the present disclosure. The display device 1000 includes a backlight module 100, a display panel 200, and a system chip 300. The system chip 300 is respectively connected to the display panel 200 and the backlight module 100. The system chip 300 is configured to provide a control signal BL to the backlight module 100 to control turning on or turning off of the backlight module 100. The system chip 300 is further configured to provide image data to the display panel 200, so that the display panel 200 displays corresponding pictures.

In the display device 1000 provided by the present disclosure, the control circuit is additionally disposed in the backlight module 100. When the backlight module 100 is connected to the system chip 300, the backlight module 100 can be turned on or turned off under the control of the control signal BL output by the system chip 300. When the backlight module 100 is not connected to the system chip 300, the control signal input terminal A is in the suspended state, that is, when the backlight module 100 does not receive the control signal BL, the lighting function of the backlight module 100 can still be realized. Therefore, when the backlight module 100 is used independently, there is no need to separately design the production jig for lighting the backlight module 100, and there is no need to perform the wiring process that exists when using the jig, thereby reducing the production cost and improving production convenience.

The backlight module and the display device provided by the present disclosure are described in detail above, specific examples are used to explain the principle and implementation of the present disclosure, the descriptions of the above embodiments are only used to help understand the present disclosure technical solutions and their core ideas. At the same time, those of ordinary skill in the art, according to the core ideas of the present disclosure, may still modify the specific implementations and application ranges, and in summary, the content of the present specification should not be construed as a limitation to the present disclosure.

What is claimed is:

1. A backlight module, comprising:

a control circuit, comprising:

a control signal input terminal, configured to receive a control signal;

a first control module, electrically connected to a first node and the control signal input terminal, configured to control a potential of the first node based on a potential of the control signal input terminal, a first power signal, a second power signal, and a third power signal; and a second control module, electrically connected to the first node, configured to output an enable signal based on the potential of the first node, the first power signal, and the third power signal, when the control signal input terminal is in a suspended state;

a power chip, wherein the power chip comprises an enable pin, the enable pin receives the enable signal, and the power chip is configured to control an output of a power supply voltage under a control of the enable signal; and light emitting components, wherein the light emitting components receive the power supply voltage, and the light emitting components are driven by the power supply voltage to emit light, wherein the first control module comprises a first transistor, a first resistor, and a second resistor;

a gate of the first transistor and one end of the first resistor are electrically connected to the control signal input terminal, one of a source and a drain of the first transistor receives the third power signal, another of the source and the drain of the first transistor and one end of the second resistor are electrically connected to the first node, another end of the second resistor receives the first power signal, and another end of the first resistor receives the second power signal, wherein the second control module comprises a second transistor and a fourth resistor;

a gate of the second transistor is electrically connected to the first node, one of a source and a drain of the second transistor receives the third power signal, another of the source and the drain of the second transistor and one end of the fourth resistor are electrically connected to an enable signal output terminal, and another end of the fourth resistor receives the first power signal.

2. The backlight module of claim 1, wherein the control circuit further comprises a storage capacitor and a third resistor;

one end of the storage capacitor receives the third power signal, another end of the storage capacitor is connected to the gate of the first transistor, and the third resistor is serially connected between the gate of the first transistor and the control signal input terminal.

3. The backlight module of claim 1, wherein the second control module further comprises a fifth resistor, and the fifth resistor is serially connected between another of the source and the drain of the second transistor and the enable signal output terminal.

4. The backlight module of claim 1, wherein the control circuit outputs a plurality of the enable signals, at least one power chip is provided, and each power chip receives a corresponding enable signal.

5. The backlight module of claim 1, wherein the backlight module comprises a first working state, a second working state, and a third working state; in the first working state, the control signal input terminal is in the suspended state, the enable signal is at a high level, and the light emitting components emit light; in the second working state, the control signal is at a first level, the enable signal is at the high level, and the light emitting components emit light; in the third working state, the control signal is at a second level, the enable signal is at a low level, and the light emitting components are turned off.

6. The backlight module of claim 1, wherein the light emitting components are mini light emitting diodes, micro light emitting diodes, or organic light emitting diodes.

7. The backlight module of claim 1, wherein when the control signal input terminal is in the suspended state, the first power signal and the second power signal are disconnected, and the light emitting components are turned off.

8. A backlight module, comprising:

a control circuit, comprising:

a control signal input terminal, configured to receive a control signal;

a first control module, electrically connected to a first node and the control signal input terminal, configured to control a potential of the first node based on a potential of the control signal input terminal, a first power signal, a second power signal, and a third power signal; and a second control module, electrically connected to the first node, configured to output an enable signal based on the potential of the first node, the first power signal, and the third power signal, when the control signal input terminal is in a suspended state;

a power chip, wherein the power chip comprises an enable pin, the enable pin receives the enable signal, and the power chip is configured to control an output of a power supply voltage under a control of the enable signal; and light emitting components, wherein the light emitting components receive the power supply voltage, and the light emitting components are driven by the power supply voltage to emit light, wherein the first control module comprises a first transistor, a first resistor, and a second resistor;

a gate of the first transistor and one end of the first resistor are electrically connected to the control signal input terminal, one of a source and a drain of the first transistor receives the third power signal, another of the source and the drain of the first transistor and one end of the second resistor are electrically connected to the first node, another end of the second resistor receives the first power signal, and another end of the first resistor receives the second power signal, wherein the second control module comprises a pull-up unit, a first control unit, and a second control unit, the enable signal comprises a first enable signal and a second enable signal;

the pull-up unit comprises a fourth resistor, one end of the fourth resistor receives the first power signal, and another end of the fourth resistor is electrically connected to a first enable signal output terminal and a second enable signal output terminal;

the first control unit comprises a second transistor, a gate of the second transistor is electrically connected to the first node, one of a source and a drain of the second transistor receives the third power signal, and another of the source and the drain of the second transistor is electrically connected to the first enable signal output terminal;

the second control unit comprises a third transistor, a gate of the third transistor is electrically connected to the first node, one of a source and a drain of the third transistor receives the third power signal, and another of the source and the drain of the third transistor is electrically connected to the second enable signal output terminal.

9. A display device, comprising a display panel, a system chip, and a backlight module, wherein the system chip is respectively connected to the display panel and the backlight module, and the backlight module comprises:

a control circuit, comprising:

a control signal input terminal, configured to receive a control signal;

a first control module, electrically connected to a first node and the control signal input terminal, configured to control a potential of the first node based on a potential of the control signal input terminal, the first power signal, the second power signal, and the third power signal; and a second control module, electrically connected to the first node, configured to output an enable signal based on the potential of the first node, the first power signal, and the third power signal, when the control signal input terminal is in a suspended state;

a power chip, wherein the power chip comprises an enable pin, the enable pin receives the enable signal, and the power chip is configured to control an output of a power supply voltage under a control of the enable signal; and light emitting components, wherein the light emitting components receive the power supply voltage, and the light emitting components are driven by the power supply voltage to emit light, wherein the first control module comprises a first transistor, a first resistor, and a second resistor;

a gate of the first transistor and one end of the first resistor are electrically connected to the control signal input terminal, one of a source and a drain of the first transistor receives the third power signal, another of the source and the drain of the first transistor and one end of the second resistor are electrically connected to the first node, another end of the second resistor receives the first power signal, and another end of the first resistor receives the second power signal, wherein the second control module comprises a second transistor and a fourth resistor;

a gate of the second transistor is electrically connected to the first node, one of a source and a drain of the second transistor receives the third power signal, another of the source and the drain of the second transistor and one end of the fourth resistor are electrically connected to an enable signal output terminal, and another end of the fourth resistor receives the first power signal.

10. The display device of claim 9, wherein the control circuit further comprises a storage capacitor and a third resistor;

one end of the storage capacitor receives the third power signal, another end of the storage capacitor is connected to the gate of the first transistor, and the third resistor is serially connected between the gate of the first transistor and the control signal input terminal.

11. The display device of claim 9, wherein the second control module further comprises a fifth resistor, and the fifth resistor is serially connected between another of the source and the drain of the second transistor and the enable signal output terminal.

12. The display device of claim 9, wherein the second control module comprises a pull-up unit, a first control unit, and a second control unit, the enable signal comprises a first enable signal and a second enable signal;

the pull-up unit comprises a fourth resistor, one end of the fourth resistor receives the first power signal, and another end of the fourth resistor is electrically connected to a first enable signal output terminal and a second enable signal output terminal;

the first control unit comprises a second transistor, a gate of the second transistor is electrically connected to the first node, one of a source and a drain of the second transistor receives the third power signal, and another of the source and the drain of the second transistor is electrically connected to the first enable signal output terminal;

the second control unit comprises a third transistor, a gate of the third transistor is electrically connected to the first node, one of a source and a drain of the third transistor receives the third power signal, and another of the source and the drain of the third transistor is electrically connected to the second enable signal output terminal.

13. The display device of claim 9, wherein the control circuit outputs a plurality of the enable signals, at least one power chip is provided, and each power chip receives a corresponding enable signal.

14. The display device of claim 9, wherein the backlight module comprises a first working state, a second working state, and a third working state; in the first working state, the control signal input terminal is in the suspended state, the enable signal is at a high level, and the light emitting components emit light; in the second working state, the control signal is at a first level, the enable signal is at the high level, and the light emitting components emit light; in the third working state, the control signal is at a second level, the enable signal is at a low level, and the light emitting components are turned off.

* * * * *